Sept. 20, 1966  YUICHIRO OYA  3,274,553

TIME-DIVISION, MULTIPLEX, NUMERICAL-CONTROL SYSTEM

Filed Jan. 17, 1963  2 Sheets-Sheet 1

United States Patent Office 3,274,553
Patented Sept. 20, 1966

3,274,553
TIME-DIVISION, MULTIPLEX, NUMERICAL-
CONTROL SYSTEM
Yuichiro Oya, Kitatama-gun, Tokyo-to, Japan, assignor to Kabushiki Kaisha Hitachi Seisakusho, Tokyo-to, Japan, a joint-stock company of Japan
Filed Jan. 17, 1963, Ser. No. 252,110
1 Claim. (Cl. 340—147)

This invention relates to numerical control systems, and more particularly it relates to a new time-division, multiplex, numerical-control system wherein, by the application of a time-division multiplex system to a pulse distributor, it is possible, with a single pulse distributor, to handle the pulse signals conventionally corresponding to a plurality of distributors and to numerically control, simultaneously and independently, a plurality of controlled machines or apparatuses.

The nature, principle, and unique features of the present invention will be best understood by reference to the following description, beginning with a brief consideration of a conventional numerical-control system, when taken in conjunction with the accompanying drawings in which.

Figure 1:
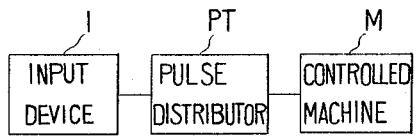
FIG. 1 is a block diagram indicating the principle of a conventional numerical-control system.

In general, as indicated in FIG. 1, a numerical-control system is normally made up of an input device I for converting input data, which have been coded and recorded on such a medium as a tape or card, into electrical signals, a pulse distributor PT for creating predetermined pulse signals for control on the basis of the output of the said input device, and a controlled apparatus or machine M which is caused to operate in accordance with these pulse signals for control. In such a system, the pulse distributor PT is composed of such circuits as various kinds of logical circuits and memory circuits. Since the pulse signals handled by these digital circuits, through their output pulses, control the action of the control member, these pulse signals have extremely slow periods (for example, of the order of 1 kilocycle per second) in comparison with those of pulse signals in the digital circuits of other apparatuses such as electronic computers. However, the above-mentioned digital circuits used in such systems as shown in FIG. 1, in general, also are capable of operating in response to pulse signals which are much faster (for example, of the order 100 kilocycles per second) than the aforesaid pulse signal periods. That is, the above-mentioned pulse distributor is not exhibiting its full capacity and has substantial surplus capacity.

Figure 2:
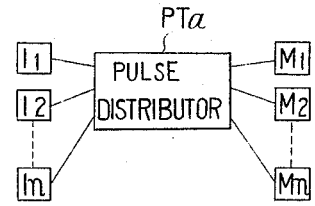
FIG. 2 is a block diagram indicating the principle of a numerical-control system according to the present invention.

The present invention, in which the above-mentioned state is utilized, provides a time-division, multiplex, numerical control system of a composition which is indicated, in principle, in FIG. 2. The system comprises input devices $I_1, I_2, \ldots I_m$, a time-division, multiplex, pulse distributor PTa to which the said input devices are connected, and controlled apparatuses or machines $M_1, M_2, \ldots M_m$ connected to and controlled by the said pulse distributor PTa.

While a detailed description of this time-division, multiplex, numerical-control system follows hereinafter, in order to facilitate a clearer understanding thereof, a simple description of a conventional system with respect to an example of its use for numerical control of a machine tool will be first presented below.

Figure 3:
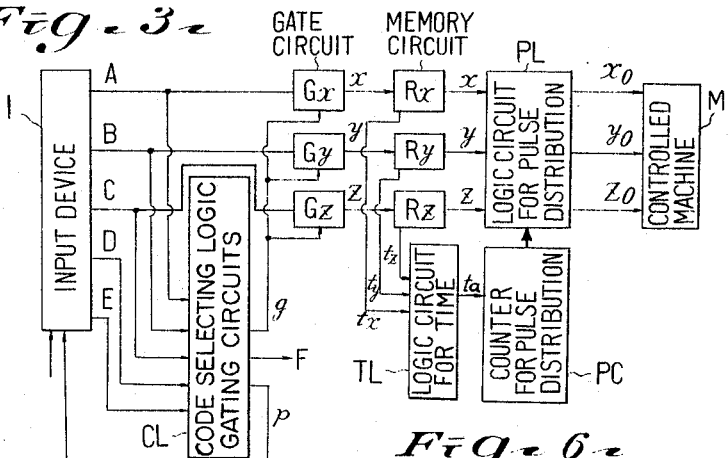
FIG. 3 is a block diagram indicating the compositional arrangement of one example of a pulse distributor in the system of FIG. 1.
Figure 4:
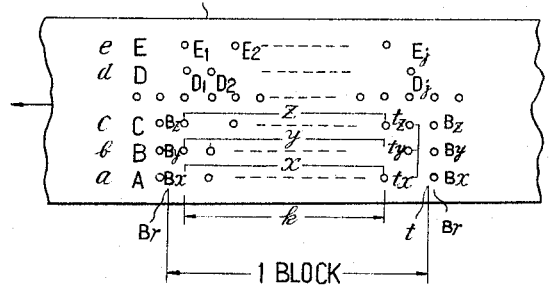
FIG. 4 is a fragmentary plan view, showing one example of a method of recording data on punched tape.

FIG. 3 indicates a general arrangement in the case of control in three dimensions X, Y, and Z of a cutting tool in the numerical control of a machine tool. In this example, such a medium as, for example, a punched tape, is used as the recording medium in the input device, and the recording method will be assumed to be one as shown in FIG. 4, wherein trains of input data $a$, $b$, $c$, $d$, and $e$ are formed in parallel rows on a tape $t_p$, and cutting signals for respective dimensions (data signals) $x$, $y$, and $z$, each made up of K digits, are recorded in the input data A, B, and C of the trains $a$, $b$, and $c$, respectively. It will be further assumed that a signal $t$ (formed from signals $t_x$, $t_y$, and $t_z$) which designates the cutting time of the cutting tool with respect to the said cutting signals $x$, $y$, and $z$ is recorded in the $K+1$ digits of the aforesaid three trains, and that auxiliary information D and E of the trains $d$ and $e$ for such functions as code selection and code error detection and correction are provided so as to form one block of information for cutting. Such blocks are formed in succession and are punctuated by respective block signals $Br$.

These signals A, B, C, D, and E of the signal trains are converted into electrical signals in the input device I, the corresponding output signals are led to memory circuits $Rx$, $Ry$, and $Rz$ by way of gate circuits $Gx$, $Gy$, and $Gz$ which control the passage of the aforesaid signals, and code selecting logical gating circuits CL are provided to carry out logical operation with the signals A, B, C, D, and E of the respective trains read out in the aforesaid input device I as parallel inputs. When the signals of any number of digits of A, B, and C are $x$, $y$, and $z$ or a signal for control $t$, the circuits CL produce a gate signal $g$ which simultaneously opens the aforesaid gate circuits $Gx$, $Gy$, and $Gz$ and thereby permits the aforesaid signals to enter successively the respective bits of the memory circuits $Rx$, $Ry$, and $Rz$. Consequently, in each of these memory circuits, for example, a signal for time control $t$ is recorded in the first bit, and signals $x$, $y$, and $z$ are recording in the second bit through the $K+1$ bit. The code selecting logical gating circuits CL further produce a stop signal P when a block signal $Br$ is read out by the input device I and causes the reading out operation of the input device I to stop.

Logical circuits TL for time are provided to carry out logical operation with the signals $(t_x, t_y, t_z)$ of the first bits of the memory circuits in which signals for time control are recorded as inputs and to produce a single signal for timing $t_a$. PC is a counter for pulse distribution which counts clock pulses, and clock pulse trains generated in a clock pulse generator are passed through control gates for timing and are introduced into inputs of appropriate digit of the counter. The appropriate digit through which each of these clock pulse trains is to be introduced is determined by the opening of the appropriate clock gate circuit by the aforesaid signal for timing, and the cutting time is determined by this operation. The output of the counter PC for pulse distribution is led to a logic circuit PL for pulse distribution, which suitably controls the output pulses of the various digits of the counter PC in accordance with the signals $x$, $y$, and $z$ of the aforesaid respective memory circuits so as to produce necessary command pulse signals $x_o$, $y_o$, and $z_o$ for following a cutting path. The said output pulse signals, in general, are further converted by a D-A converter into analog electrical signals and, moreover, are amplified, after which they cause the cutting tool to be moved in controlled movement. The reference letter M designates the controlled machine.

When the control operation in accordance with one block of signals is completed, the afore-mentioned input device I is again caused to operate to start a control operation based on the signals of the succeeding block. By the progressive repetition of this procedure, the cutting tool of the controlled means is caused to move and accomplish cutting in a continuous manner.

Figure 5:
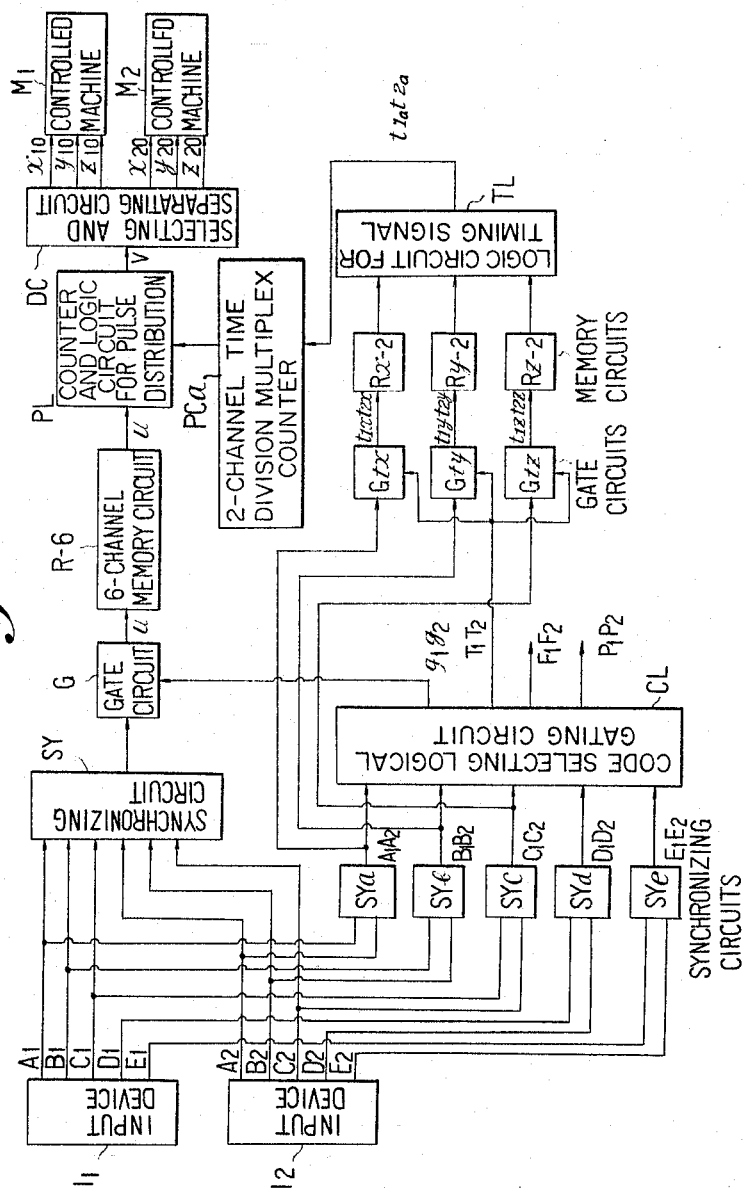
FIG. 5 is a block diagram indicating the compositional arrangement of a system according to this invention corresponding to the system of FIG. 2.

In a system of the above description, the present invention utilizes a plurality of input devices and controlled apparatuses or machines and makes the pulse distributor time-division multiplex type. In this case, relative to the signals which cause the cutting signal of each dimension of the input device to carry out logical operation independently, among the signals transferred to the various kinds of logical circuits in the said pulse distributor, time-division multiplexing is possible with respect to an all cutting signals of each dimension of all respective input devices. On the other hand, in the part carrying out logical operation by taking coincidence and non-coincidence between the various outputs of the input devices, time-division multiplexing is possible only between the outputs of the equivalent terminals of the various input devices., A numerical-control system which introduces time-division multiplex system with consideration of the foregoing points is shown in FIG. 5. This embodiment is an example of time-division multiplex system in the case of three-dimensional control of the machine tool described above in connection with FIG. 3, two units of each of the input devices and controlled machines being shown for the sake of simplicity of exposition.

Referring to FIG. 5, the recording mediums within the input devices $I_1$ and $I_2$ will be assumed to be punched tapes of the afore-mentioned recording system, and the recording signals of their respective trains will be respectively denoted by $A_1$, $B_1$, $C_1$, $D_1$, and $E_1$ and $A_2$, $B_2$, $C_2$, $D_2$, and $E_2$.

The cutting signals of the various dimensions and the signals for time control in the signals $A_1$, $B_1$, and $C_1$ and $A_2$, $B_2$, and $C_2$ among the above-named signals will be respectively denoted by $x_1$, $y_1$, $z_1$, and $t_1$ and $x_2$, $y_2$, $z_2$, and $t_2$. The signals (made up of 1 and 0 of binary code) of each digit of the signals $x_1$, $y_1$ and $z_1$ and $x_2$, $y_2$, $z_2$, among the above-named signals, made up of signals of K digits will be respectively denoted by $x_{11}$, $x_{12}$, ... $x_{1k}$, $y_{11}$, $y_{12}$, ... $y_{1k}$, and $z_{11}$, $z_{12}$ ... $z_{1k}$; and $x_{21}$, $x_{22}$, ... $x_{2k}$, $y_{21}$, $y_{22}$, ... $y_{2k}$, and $z_{21}$, $z_{22}$, ... $z_{2k}$. Further, the signals (made of of 1 and 0 of binary code) of each digit of auxiliary signals $D_1$ and $E_1$ and $D_2$ and $E_2$ will be denoted by $D_{11}$, $D_{12}$, ... $D_{1j}$ and $E_{11}$, $E_{12}$, ... $E_{1j}$; and $D_{21}$, $D_{22}$, ... $D_{2j}$ and $E_{21}$, $E_{22}$, ... $E_{2j}$. It will further be considered that the signals $t_1$ and $t_2$ are formed, respectively, by $t_{1x}$, $t_{1y}$, and $t_{1z}$ and $t_{2x}$, $t_{2y}$, and $t_{2z}$. These signals are generated in the respective input devices $I_1$ and $I_2$ as electrical signals $A_1$, $B_1$, $C_1$, $D_1$, and $E_1$ and $A_2$, $B_2$, $C_2$, $D_2$, and $E_3$.

Reference letters $SY_a$, $SY_b$, $SY_c$, $SY_d$, and $SY_e$ designate synchronizing circuits of two channels for time-division multiplexing the signals of the same trains of output signals of the input devices $I_1$ and $I_2$ by using two-phase synchronous pulses and generate, respectively, two channel time-division multiplex signals $A_1A_2$, $B_1B_2$, $C_1C_2$, $D_1D_2$, and $E_1E_2$ of each train of the input.

That is:

$A_1A_2 = \ldots x_{11}x_{21}x_{12}x_{22} \ldots t_{1x}t_{2x}$
$B_1B_2 = \ldots y_{11}y_{21}y_{12}y_{22} \ldots t_{1y}t_{2y}$
$C_1C_2 = \ldots z_{11}z_{21}z_{12}z_{22} \ldots t_{1z}t_{2z}$
$D_1D_2 = \ldots D_{11}D_{21}D_{12}D_{22} \ldots D_{1j}D_{2j}$
$E_1E_2 = \ldots E_{11}E_{21}E_{12}E_{22} \ldots E_{1j}E_{2j}$ These indicate signals within one block, in which other signals such as block signals are also included.

These time-division multiplex signals of two channels enter code selecting logical gating circuits CL, in the output of which are produced a control signal $g_1g_2$ for numerical data gate, a stop signal $P_1P_2$, and a control signal $T_1T_2$ for time data gate of two channels corresponding to the read out signal of the input devices. That is, while in the afore-described conventional system, when the cutting signals $x$, $y$, and $z$ of the three dimensions and the signal $t$ for time control arrive at the code selecting logical gating circuits CL, a gate control signal $g$ is generated, in the embodiment of this invention, when data signals ($x_1$, $y_1$, and $z_1$ and $x_2$, $y_2$, and $z_2$) of the input devices arrive at the circuits CL, a two channel multiplex control signal $g_1g_2$ for numerical data gate is produced, and when signals for time control of the input devices arrive, a two channel multiplex control signal $T_1T_2$ for time data gate is produced.

The signals $A_1$, $B_1$, $C_1$, $A_2$, $B_2$, and $C_2$ are also led to synchronizing circuits SY which, receiving these signals as inputs, makes these signals time-division multiplex ones by the use of six-phase synchronous pulses. The time-division multiplex output signals of these synchronizing circuits SY are gate controlled in gate circuits G for numerical data in accordance with the control signal $g_1g_2$ for numerical data gate produced in the aforementioned circuits CL only at the time of arrival of numerical data signal, and only data signals in the signals $A_1$, $B_1$, $C_1$ and $A_2$, $B_2$, $C_2$ are permitted to pass through. That is, if it is considered that signals of the same kind are produced simultaneously in the outputs of the input devices, the time-division, multiplex data signal U of 6 channels is $x_{11}x_{21}y_{11}y_{21}z_{11}z_{21}x_{12}x_{22}y_{12}y_{22}z_{12}z_{22} \ldots x_{1k}x_{2k}y_{1k}y_{2k}z_{1k}z_{2k}$. Reference symbol R–6 designates 6-channel, time-division, multiplex memory circuits in which the aforesaid time-division, multiplex data signal for the three dimensions is memorized.

Gate circuits $G_{tx}$, $G_{ty}$, and $G_{tz}$ for time control are provided to be operated by the two channel multiplex control signal $T_1T_2$ for time data gate produced in the aforesaid code selecting logical gating circuits CL to cause the passage of only the time signals $t_{1x}$, $t_{1y}$, and $t_{1z}$ ($=t_1$) and $t_{2x}$, $t_{2y}$, and $t_{2z}$ ($=t_2$) contained in the signals $A_1$, $B_1$, and $C_1$ and $A_2$, $B_2$, and $C_2$ respectively. Accordingly, the pulses passed by these gate circuits for time control are 2-channel, time-division, multiplex signals $t_{1x}t_{2x}$, $t_{1y}t_{2y}$, and $t_{1z}t_{2z}$. These 2-channel, time-division, multiplex signals for time control are memorized in 2-channel, time-division, multiplex memory circuits $R_x$–2, $R_y$–2, and $R_z$–2 and are read out at appropriate times to be introduced into a logic circuit TL, where logical operation is carried out with signals $t_{1x}$, $t_{1y}$, and $t_{1z}$ as one combination to obtain a time command signal $t_{1a}$ in the input device $I_1$, logical operation is carried out with signals $t_{2x}$, $t_{2y}$, and $t_{2z}$ as one combination to obtain a time command signal $t_{2a}$ in the input device $I_2$, and these signals are sent out as a time-division, multiplex signal $t_{1a}t_{2a}$ for time control.

A two channel time division multiplex counter PCa is provided to carry out counting for pulse distribution, introducing the clock pulses synchronized to each channel into the input of appropriate bits of counter, for each channel, in accordance with the aforesaid 2-channel, multiplex signal $t_{1a}t_{2a}$ for time control. The non-carry pulses of each channel of each bit thereof are controlled in accordance with the data signals recorded in the afore-mentioned 6-channel memory circuits R–6, whereby the required time-division, multiplex pulse signal V for cutting control is obtained. This signal V for cutting control is separated according to equipment and dimension in selecting and separating circuits DC in which 6-channel synchronous pulses are used, whereby cutting control signals $x_{10}$, $y_{10}$, $z_{10}$ and $x_{20}$, $y_{20}$, $z_{20}$ for two machines are obtained. These signals are introduced into the controlled machines $M_1$ and $M_2$ to control the cutting path of the cutting tool in each machine.

Figure 6:
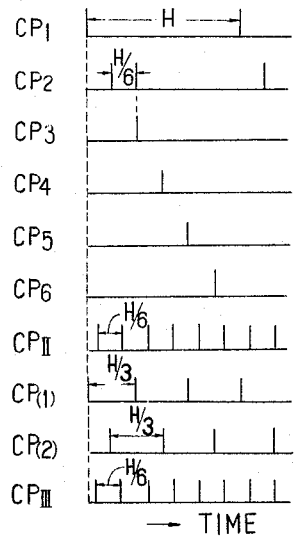
FIG. 6 is a timing chart indicating the timing of a synchronous pulse system suitable for use with the system shown in FIG. 5.

The relationships of the synchronous pulses mentioned in the above-description are as indicated in FIG. 6. The pulses designated by $CP_1$ through $CP_6$, inclusive, are synchronous pulses of 6-phases with a period H which are used in the 6-channel synchronizing circuits SY, the 6-channel memory circuits R-6, and the 6-channel etc., selecting and separating circuits DC and are mutually staggered by a period of H/6. The pulses designated by $CP_{II}$ are synchronous pulses of a period H/6 which determine the signal pulse width of each of the aforesaid phases. The pulses designated by $CP_{(1)}$ and $CP_{(2)}$ are 2-phase synchronous pulses with a period H/3 which are used in such circuits as the 2-channel synchronizing circuits as the 2-channel synchronizing circuits $SY_a$, $SY_b$, $SY_c$, $SY_d$, and $SY_e$ and the 2-channel, time-division, multiplex memory circuits R$x$-2, R$y$-2, and R$z$-2, the 2-channel time-division multiplex counter PC$a$, etc. the two phases being mutually staggered by a period of H/6. The pulses designated by $CP_{III}$ are synchronous pulses with a period H/6 which determine the signal pulse width of each of the aforesaid phases.

Memory circuits used in such a pulse distributing circuit as described above are generally composed of input registers for temporary memory and output registers for logical operation. In the present invention, each of these registers are time-division multiplexed. The above-described embodiment illustrates the case wherein two input devices, each of five channels having a train of information data consisting of a train of data information A, B, and C, including three-dimensional command signals $x$, $y$, and $z$, and a train of data information D and E as auxiliary signals, are provided, and the time-division, multiplex, pulse distributor has two kinds of time-division, multiplex signal paths, namely, 6-channel and 2-channel, whereby two controlled machines are simultaneously controlled. The invention, however, is not to be limited to this case. In general, the present invention contemplates a system wherein the number of input devices is $m$, and, if the respective command signals of each of these input devices are assumed to be $n_1, n_2, \ldots n_m$ channels, the time-division, multiplex pulse distributor will have at least two kinds of time-division, multiplex signals paths, namely, $m$-channel and $$\sum_{i=1}^{m} n_i = \text{channel}$$

whereby output signals for $m$ machines are simultaneously generated to control $m$ controlled machines. In many such cases, each input device generates, simultaneously, auxiliary signals of any channel together with command signals.

Furthermore, although the relationships of the output signals between the various devices have been described on the assumption that signals of the same kind are generated simultaneously, such relationships are not always necessary, and it is possible to handle each independently. Moreover, although in the foregoing description other circuits have been omitted for simplicity of explanation, time-division multiplexing is similarly accomplished, of course, also with respect to these other circuits.

It is to be observed that the system of this invention is not limited to the numerical control of machine tools but can be applied also to other digital control equipment. It will be further appreciated that, since the numerical-control system of this invention as described above is capable of accomplishing, simultaneously, a plurality of numerical-control operations with a single pulse distributor, it has great advantages in economy and possibility for miniaturization of the entire system.

Although the present invention has been described in conjunction with a particular embodiment thereof, it is to be understood that modifications and variations may be resorted to therein without departing from the spirit and scope of the invention, as those skilled in the art will readily understand. Such modifications and variations are considered to be within the purview and scope of the invention and appended claim.

What is claimed is:

A time-division, multiplex numerical control system for accomplishing digital information processing, which comprises: $m$ digital input devices, each generating respective command signals of $n_1, n_2 \ldots n_m$ channels and auxiliary signals corresponding to said respective command signals; a first synchronizing circuit which produces a time-division multiplexed signal of said respective command signals by synchronous pulses; a second synchronizing circuit which produces a time-division multiplexed signal of said respective command signals and auxiliary signals by synchronous pulses; a code selecting logical gating circuit which selects codes of the output time-division multiplexed signal of said second synchronizing circuit and produces various gate control signals, in accordance with said selected codes; a first gate circuit which controls an output time-division signal of said first synchronizing circuit to pass through said first gate circuit by one of said various gate control signals and passes a data signal of said output time-division signal through said first gate circuit; a first time-division memory circuit which memorizes said data signal; second gate circuits which control output time-division signals of said second synchronizing circuits to pass through said second gate circuit by another of said various gate control signals and passes time control signals of said output time division signals through said second gate circuits; second time-division memory circuits of $m$ channel which memorize said time control signals from said second time-division memory circuits and produces time command signals in each input device; a counter circuit which introduces clock pulses synchronized with each channel into the input of appropriate bits of said counter circuit for each channel in accordance with said time command signal and counts said clock pulses; a time-division multiplexed pulse distribution circuit which controls the non-carry pulses of each channel of each bit of said counter circuit in accordance with said data signals and produces the time-division controlling command pulses of $m$ channels; a separating circuit which separates said time-division controlling command pulse trains of $m$ channel for $m$ controlled devices.

References Cited by the Examiner

UNITED STATES PATENTS 2,740,838   4/1956   Pierce _____ 343—204 X
2,771,553   11/1956  Metzgler et al.
2,905,760   9/1959   Walker et al. _____ 178—50

OTHER REFERENCES

Publication: "Announcing Digitron," Feb. 8, 1952, page 19 relied upon.

NEIL C. READ, *Primary Examiner.*

PETER XIARHOS, ALVIN H. WARING,

*Assistant Examiners.*